United States Patent
Bourdrez et al.

(10) Patent No.: US 10,139,297 B2
(45) Date of Patent: Nov. 27, 2018

(54) METHOD FOR ESTIMATING IN REAL TIME THE FORCE ON THE TIE-RODS WITHIN A POWER STEERING MECHANISM

(71) Applicant: JTEKT EUROPE, Irigny (FR)

(72) Inventors: Sébastien Bourdrez, Yzeron (FR); Pascal Moulaire, La Tour de Salvagny (FR); Christophe Ravier, Saint Pierre de Chandieu (FR)

(73) Assignee: JTEKT EUROPE, Irigny (FR)

( * ) Notice: Subject to any disclaimer, the term of this patent is extended or adjusted under 35 U.S.C. 154(b) by 52 days.

(21) Appl. No.: 15/320,085

(22) PCT Filed: Jun. 19, 2015

(86) PCT No.: PCT/FR2015/051630
§ 371 (c)(1),
(2) Date: Dec. 19, 2016

(87) PCT Pub. No.: WO2016/005671
PCT Pub. Date: Jan. 14, 2016

(65) Prior Publication Data
US 2017/0131164 A1   May 11, 2017

(30) Foreign Application Priority Data
Jul. 9, 2014 (FR) .................... 14 56607

(51) Int. Cl.
*G01L 5/22* (2006.01)
*B62D 6/00* (2006.01)

(52) U.S. Cl.
CPC ............. *G01L 5/221* (2013.01); *B62D 6/008* (2013.01)

(58) Field of Classification Search
CPC ............................... B62D 6/008; G01L 5/221
USPC ............... 702/41; 280/93.5; 701/41, 42, 48
See application file for complete search history.

(56) References Cited

U.S. PATENT DOCUMENTS

| | | |
|---|---|---|
| 2009/0243245 A1 | 10/2009 | Hayakawa et al. |
| 2014/0163822 A1 | 6/2014 | Strecker et al. |

FOREIGN PATENT DOCUMENTS

| | | |
|---|---|---|
| DE | 102011052881 A1 | 2/2013 |
| WO | 2013/061568 A1 | 5/2013 |

OTHER PUBLICATIONS

Sep. 22, 2015 International Search Report issued in International Patent Application No. PCT/FR2015/051630.

*Primary Examiner* — John H Le
(74) *Attorney, Agent, or Firm* — Oliff PLC

(57) ABSTRACT

A method determines a link force within a power-steering mechanism of a vehicle, the method including a step (a) of determining an actuation force, which involves determining the actuation force that results from the assistance force exerted by the assistance motor and the driver force exerted by the driver of the vehicle on the steering mechanism; a step (b) of assessing dry friction; and a step (c) of calculating the link force, which has a summation sub-step which involves calculating an expression representing the link force, which uses the algebraic sum of the actuation force and the dry friction force, and a filtering sub-step which involves applying a low-pass filter in order to smooth the result of the expression when the expression is calculated upon a steering reversal of the steering mechanism.

10 Claims, 2 Drawing Sheets

Figure 1:
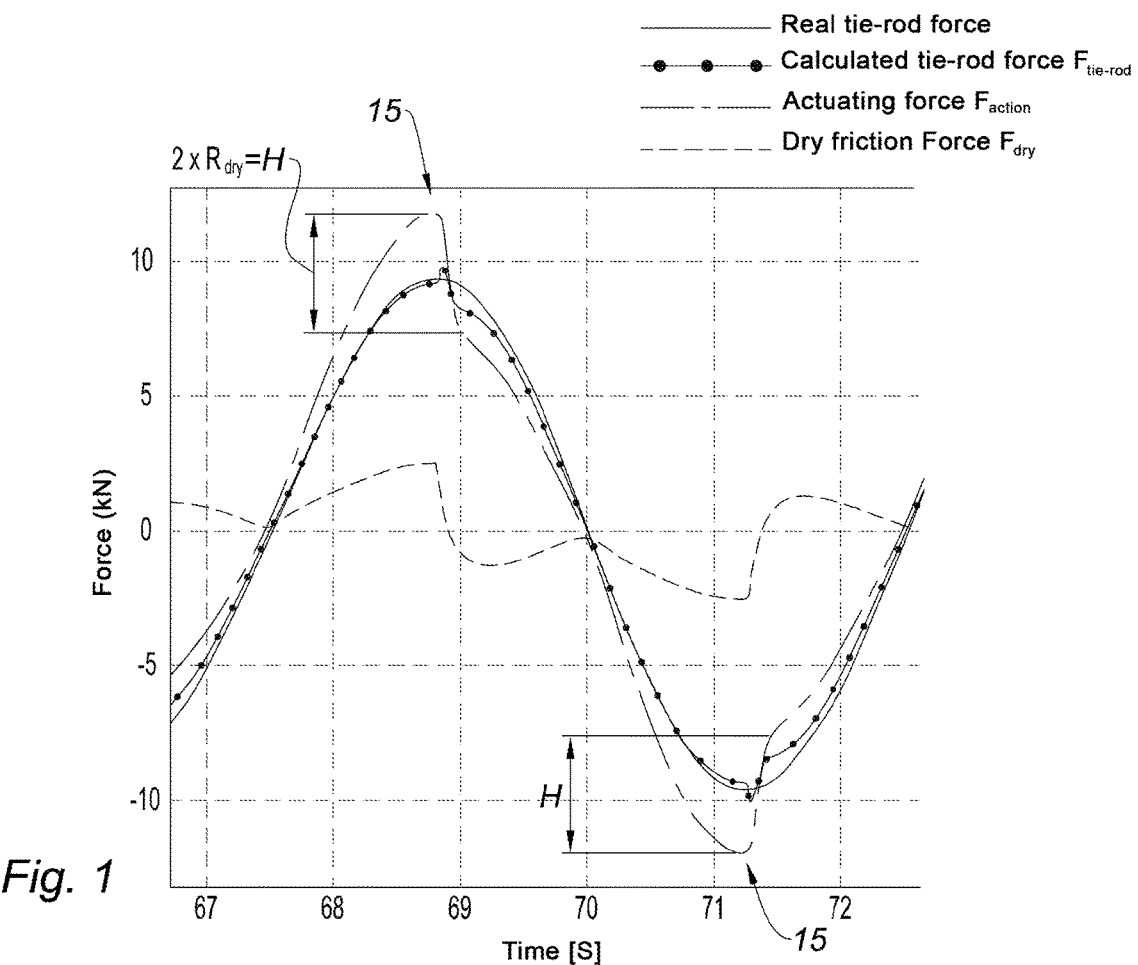

METHOD FOR ESTIMATING IN REAL TIME THE FORCE ON THE TIE-RODS WITHIN A POWER STEERING MECHANISM

The present invention relates to the general field of power steering equipping vehicles, and in particular motor vehicles, as well as to the methods for managing such power steering.

In a known manner, a power steering has the main function of helping the driver to turn the steered wheels of the vehicle, by combining an assistance force, provided by an assistance motor, to the driver force, which is manually exerted by the driver on the direction, generally by means of a steering wheel.

The combination of the driver force and of the assistance force forms an actuating force which allows countering the resistant force exerted by the environment of the vehicle on the steering mechanism, wherein said resistant force is essentially caused by the contact between the tyres and the road.

This resistant force, brought to the endpoints of the steering system, that is to say to the endpoints of the system formed by the steering mechanism, constitutes the force called «tie-rod force» (or «force on the tie-rods»).

In practice, within a usual directional running gear, said tie-rod force corresponds in fact to the algebraic sum of the forces exerted on the steering mechanism, and more particularly on the steering rack, on the one hand, by the left steering tie-rod, which connects the rack to the left steered wheel and, on the other hand, by the right steering tie-rod, which connects the rack to the right steered wheel (one of said tie-rods is working, at a considered instant, in traction, while the other is working in compression).

It so happens that the value of the tie-rod force constitutes a particularly useful or even fundamental data, to characterize and manage the power steering, because many problems directly depend on this value. By way of example, the problem of dimensioning of the assistance motor can be in particular cited.

However, it is in practice difficult to estimate accurately this tie-rod force.

Admittedly, force sensors can be provided for this purpose and placed for example at the junctions between the rack and the tie-rods, but such a solution tends to increase the overall dimension, the weight and complexity of the power steering system, as well as the cost thereof.

According to another approach, it can be possible to proceed, in a first approximation, to an estimation of the tie-rod force by summing, on the one hand, the driver force, which can be measured, for example, by means of a torque sensor disposed between the steering wheel and the steering column and, on the other hand, the assistance force, which can be measured, for example, by means of the set point applied to the assistance motor, and by assimilating the tie-rod force to the sum obtained accordingly, that is to say, by considering that the tie-rod force is equal to the actuating force exerted on the steering mechanism.

However, the inventors found that such an approximation was relatively coarse and could have significant differences with the true value of the tie-rod force.

In particular, the inventors have discovered that these differences appear as soon as one begins to apply an actuating force, and tend to accentuate when said actuating force increases, so that, in practice, the aforementioned approximation is only really valid in the vicinity of the straight line, when the steering system is little, or even not operated.

Conversely, the difference between the actuating force and the real tie-rod force is particularly high, and therefore the approximation is particularly inaccurate, during the steering reversals, that is to say when the driver of the vehicle changes (intentionally) the direction in which he actuates the steering wheel, this change having the aim and the effect of changing from a steering situation of turning left, in which the driver exerts a force which pulls the steering wheel to the left, to a steering situation of turning right, in which the driver exerts a force which pulls the steering wheel to the right, or vice versa, from a steering situation of turning right to a steering situation of turning left.

Furthermore, the inventors found that the difference between the actuating force and the real tie-rod force could be particularly sensitive to the operating conditions of the steering mechanism, in particular to the temperature conditions, as well as to the wear status of said mechanism.

In practice, all these limitations can thus considerably reduce the effective availability of the function of assessing the tie-rod force, or even make assessing the tie-rod force relatively uncertain.

The objects assigned to the invention therefore aim to overcome the aforementioned disadvantages and to propose a new method for determining the tie-rod force which allows determining reliably and accurately, at any time, in every situation of life of the vehicle, the tie-rod force which is exerted on a steering mechanism.

The objects assigned to the invention are achieved by means of a method for determining a force called «tie-rod force» which is representative of the force exerted, at a considered instant, by the environment of a vehicle on a power steering mechanism which equips said vehicle and which is maneuvered at least by an assistance motor, said method comprising:
  a step (a) of determining an actuating force during which the actuating force exerted at the considered instant on the steering mechanism is determined, such that said actuating force results from the assistance force exerted by the assistance motor on the steering mechanism and/or from the driver force exerted by the driver of the vehicle on said steering mechanism,
  a step (b) of assessing a dry friction, during which the dry friction force exerted on the steering mechanism at the considered instant is assessed,
  a step (c) of calculating the tie-rod force which comprises a summing sub-step (c1) during which an expression representative of the tie-rod force is calculated, which involves the algebraic sum of the actuating force and the dry friction force, and a filtering sub-step (c2) during which a low-pass filter is applied, in order to be able to smooth the result of said expression when said expression is calculated at the moment of a steering reversal of the steering mechanism.

Advantageously, taking the dry friction into consideration when assessing the tie-rod force, makes it possible to determine said tie-rod force in a much more accurate manner than before.

Indeed, the inventors have discovered that the dry friction could generally explain a significant part, if not the totality, of the difference observed between the actuating force and the real tie-rod force.

Consequently, by correcting the assessment of the tie-rod force so as not to neglect (anymore) the force component connected to the phenomenon of dry friction, component which can be the cause of a significant difference between the actuating force and the tie-rod force, the precision and the reliability of said assessment is improved in most, and possibly the totality, of the vehicle life situations, in particular in all maneuver situations, whatever the nature and intensity of the concerned maneuver, and in particular during the steering reversals.

Advantageously, it will be noted that this gain in accuracy occurs while still having a calculation formula (expression) which is particularly simple and fast to implement.

Furthermore, the inventors have discovered that the sensitivity to the operating temperature and wear conditions of the known methods for determining the tie-rod force was significantly attributable to the sensitivity of the dry friction to said temperature and wear conditions.

Consequently, again, considering the dry friction allows gaining in accuracy.

More particularly, the fact of assessing this dry friction at the instant chosen to calculate the tie-rod force, for example by carrying out a friction measurement or by using a model which is updated over time from empirical data acquired within the steering mechanism, makes it possible to take account, substantially in real time, of the evolutions of the dry friction due to the temperature factors and wear factors, and thus to assess at any time, reliably, an estimated tie-rod force which is faithfully representative of the effective tie-rod force which is actually exerted on the steering mechanism.

Then, implementing a low-pass filtering makes it possible to take account of the physical dynamics of the steering system, and more particularly the dynamics connected to the duration (even if said is possibly very small) which is necessary for achieving switching of the dry friction value (that is to say the duration required to perform the reversal of sign of said friction value) at the moment of the steering reversals, when the speed of movement of the steering mechanism (and in particular of the steering wheel) is reversed.

Indeed, if the switching of the dry friction value was perceived in a "binary" manner, that is to say as an apparent discontinuity, due in particular to the fact that the calculator which manages the method in accordance with the invention proceeds by sampling, then this switching might punctually cause a divergence during the instantaneous execution of the calculation of the expression representative of the tie-rod force.

In the absence of a filter, such a divergence could then make a peak-type artifact appear, which would totally distort the assessment of the tie-rod force.

That is why using a low-pass filter, whose time constant is of the same order of magnitude as the real switching duration of the dry friction, advantageously allows to soften the effects of the steering reversals on the calculation of the tie-rod force, by a smoothing which allows to maintain, in all circumstances, the result of the expression, that is to say the calculated tie-rod force, as closely as possible to the effective value of the real tie-rod force.

Thanks to the low-pass filter which improves the stability of the calculation of the tie-rod force, the method according to the invention is therefore particularly reliable in all the vehicle life situations, including during the steering reversals and in the vicinity thereof.

Other objects, characteristics and advantages of the invention will appear in more detail upon reading the description which follows, as well as with the help of the annexed drawings, provided for purely illustrative and non-restrictive purposes, among which:

FIG. 1 illustrates, on a time diagram, the co-evolution, during a succession of steering reversals, on the one hand, of the actuating force which corresponds to the accumulation of the assistance force and of the driver force, on the other hand, of the dry friction force assessed in accordance with the invention, then of the tie-rod force calculated according to the method in accordance with the invention, and finally of the real tie-rod force.

Figure 2:
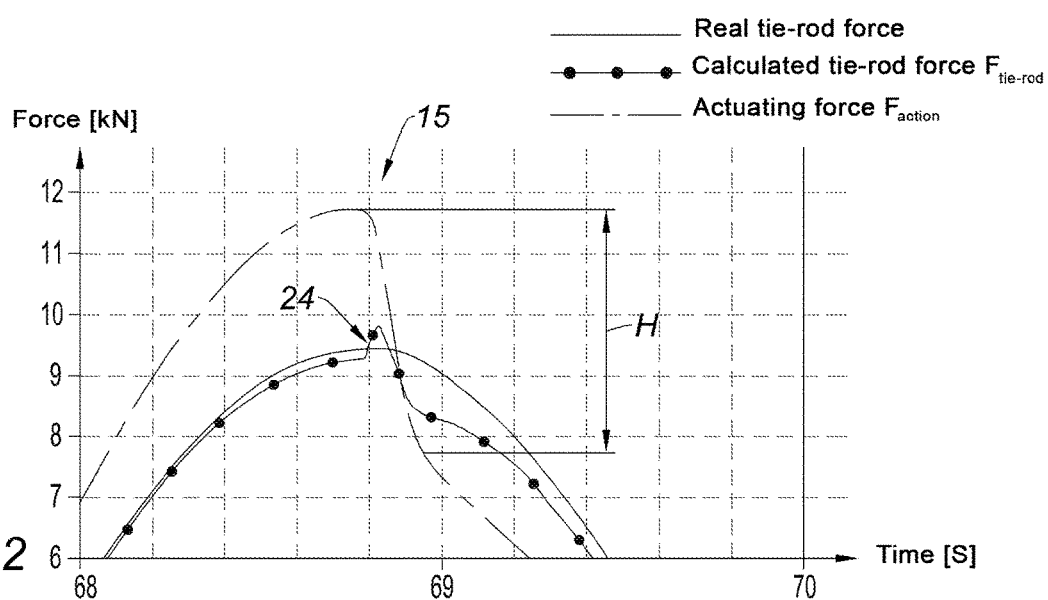

FIG. 2 shows an enlarged detail view of a portion of FIG. 1.

Figure 3:
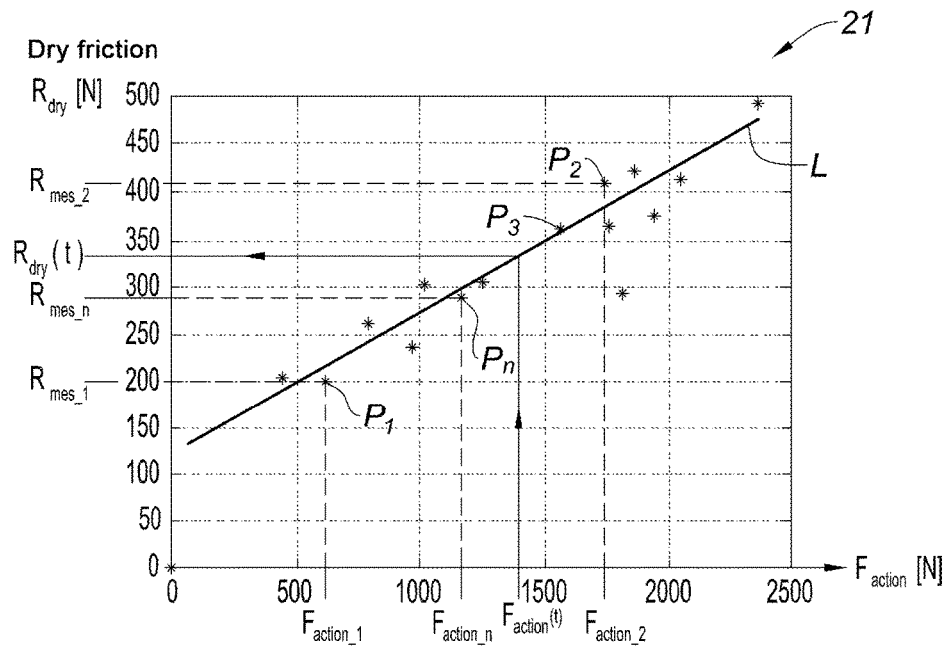

FIG. 3 illustrates, on a diagram which expresses the friction (as the ordinate) as a function of a variable (as the abscissae) representative of the assistance force, and more particularly as a function of the total actuating force corresponding to the accumulation of the assistance force delivered by the motor and of the manual force exerted by the driver on the steering wheel, an example of empirical model of dry friction obtained from a scatter chart of characterization points measured over time, and a corresponding correlation law.

Figure 4:
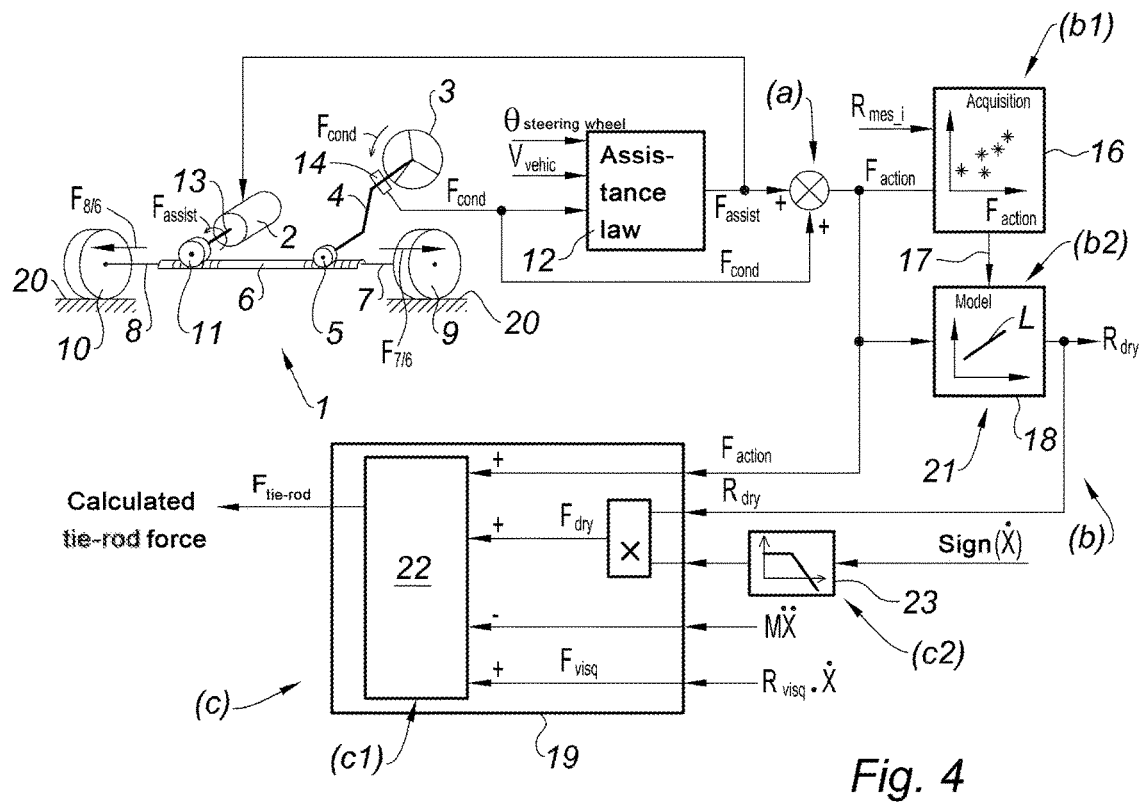

FIG. 4 shows schematically the implementation of a method in accordance with the invention within a vehicle.

The invention concerns a method for determining a force called «tie-rod force» $F_{tie\text{-}rod}$ which is exerted within a power steering mechanism 1 equipping a vehicle, in particular a motor vehicle.

As illustrated in FIG. 4, said steering mechanism 1 is maneuvered by at least one assistance motor 2, capable of delivering for this purpose an assistance force $F_{assist}$ which is applied on said steering mechanism 1.

It can be considered indifferently any type of assistance motor 2, and more particularly any type of assistance motor which can be operated in either one of the other of two opposite directions.

In particular, the invention can be applied to a rotary assistance motor 2 intended to exert an assistance force $F_{assist}$ of the torque type, as well as to a linear assistance motor 2, intended to exert an assistance force $F_{assist}$ of the traction or compression type.

Moreover, said assistance motor 2 can for example be hydraulic, or preferably electric (the use of an electric motor makes in particular easier implanting and implementing said motor, as well as generating and managing the useful signals).

Particularly preferably, the assistance motor 2 will be a rotary electric motor, for example of the «brushless» type.

Moreover, as illustrated in FIG. 4, the power steering mechanism 1 preferably comprises, in a manner known per se, a steering wheel 3 by which the driver of the vehicle can rotatably drive a steering column 4 which meshes, by means of a pinion 5, on a steering rack 6 that is slidably mounted in a steering casing which is secured to the chassis frame of the vehicle.

The ends of the steering rack 6 are preferably each connected, by means of a steering tie-rod 7, 8, to an yaw-orientable knuckle, on which is mounted a steered wheel 9, 10 (which is preferably also a drive wheel) of the vehicle, in such way that the movement of the rack 6 in translation in the steering casing causes a change in the steering angle (i.e. a change of the yaw orientation) of said steered wheels 9, 10.

The assistance motor 2 can engage the steering column 4, for example by means of a worm wheel and worm screw reducer, or engage directly the steering rack 6, by a driving mechanism of the ball screw type or via a motor pinion 11 distinct from the pinion 5 of the steering column (so as to form, for example, a steering mechanism called «dual-pinion» mechanism, as schematized in FIG. 4).

The force setpoint (or, more preferably, the torque setpoint, noted $F_{assist}$ in FIG. 4) which is applied to the assistance motor 2 so that said motor assists the driver in the maneuvering of the steering mechanism 1 depends on predetermined assistance laws, stored in a non-volatile memory of a calculator (herein a module for applying assistance laws 12), said assistance laws being able to adjust said force setpoint as a function of various parameters such as the steering wheel force (torque) $F_{cond}$ exerted by the driver on the steering wheel 3, the (longitudinal) speed $v_{vehic}$ of the vehicle, the angular position $\theta_{steeringwheel}$ of the steering wheel 3, etc.

For the mere sake of description, it will be considered that the force setpoint applied to the assistance motor 2 faithfully reflects the assistance force $F_{assist}$ delivered by said assistance motor, so that the two quantities can be assimilated one to the other.

According to the invention, the tie-rod force $F_{tie-rod}$ corresponds to the force exerted, at a considered instant $\underline{t}$, by the environment 20 of the vehicle (that is to say typically the road 20 on which said vehicle is traveling) on the power steering mechanism 1 which equips said vehicle.

In practice, with reference to the example of FIG. 4, said tie-rod force $F_{tie-rod}$ corresponds in fact to the algebraic sum of the forces $F_{7/6}$ and $F_{8/6}$ which are exerted on the steering mechanism, herein at the endpoints of the rack 6, on the one hand, by the left steering tie-rod 7, which in fact transmits to the rack 6 (such as schematized by the force $F_{7/6}$) the resistant force that is exerted by the road 20 on the left steered wheel 9 and, on the other hand, by the right steering tie-rod 8, which transmits to the same rack 6 (as schematized by the force $F_{8/6}$) the resistant force that is exerted by the road 20 on the right steered wheel 10 (wherein one of said tie-rods 7, 8 is working, at a considered instant, in traction, while the other is working in compression).

It will be noted that the method in accordance with the invention advantageously allows to estimate substantially in real time the tie-rod force $F_{tie-rod}$, and therefore to accurately quantify at any moment the action of the road 20 on the directional running gear, wherein said directional running gear moreover preferably corresponds to the front axle of the vehicle.

According to the invention, the method comprises a step (a) of determining an actuating force $F_{action}$ during which the (total) actuating force $F_{action}$ which is exerted at the considered instant on the steering mechanism 1 is determined, such that said actuating force results from the assistance force $F_{assist}$ exerted by the assistance motor 2 on the steering mechanism 1, and/or from the driver force $F_{cond}$ (manually) exerted by the driver of the vehicle on said steering mechanism 1 (herein via the steering wheel 3).

It will be noted that, in practice, the actuating force $F_{action}$ can be equal to the (only) driver force $F_{cond}$, in case of inaction of the assistance motor 2.

Conversely, the actuating force $F_{action}$ can be equal to the only assistance force $F_{assist}$ assist if the driver force $F_{cond}$ is zero, either because the driver has released the steering wheel 3, for example during an automatic maneuver of the direction performed by the assistance motor, such as a parking assistance maneuver, or because the steering wheel 3 merely serves as a heading indicator and is not mechanically connected to the rack 6, so that the forces necessary to the steering maneuvers are ensured exclusively by the assistance motor 2.

However, for the sake of description, and with regard to the example of the steering mechanism 1 illustrated in FIG. 4, it will be considered in what follows that the actuating force $F_{action}$, which corresponds to the resultant of the different maneuvering forces which are intentionally applied on the steering mechanism 1 to change the steering angle of said steering mechanism or to maintain the steering angle of said mechanism to a selected value, is equal to the (algebraic) sum of the respective contributions of the driver force $F_{cond}$ and of the assistance force $F_{assist}$.

Of course, the driver force $F_{cond}$ and the assistance force $F_{assist}$ can be assessed by any appropriate means.

Preferably, the assistance force $F_{assist}$ can be assessed by measuring (for example as output of the application module of the assistance laws 12) the torque setpoint applied to the assistance motor 2, or by measuring, by means of a motor torque sensor placed on the shaft 13 of the assistance motor 2, the assistance force actually delivered by said assistance motor.

The driver force $F_{cond}$, or «steering wheel torque», exerted by the driver on the steering wheel 3 can in turn be measured by an appropriate steering wheel torque sensor 14, such as a magnetic torque sensor that measures the elastic deformations of a torsion bar placed between the steering wheel 3 and the steering column 4.

According to the invention, the method also comprises a step (b) of assessing dry friction, during which the dry friction force $F_{dry}$, $R_{dry}$ exerted on the steering mechanism 1 at the considered instant $\underline{t}$ is assessed.

It is meant by «dry friction», as opposed to the viscous friction which is dependent on (proportional to) the speed of movement of the mechanism, the friction, not dependent on the sliding speed, which is due to the surface contact (lubricated or not) between two solids, as described by the Coulomb law, and which can be expressed in the form: $F_{dry} = -R_{dry} \cdot \text{sign}(\dot{X})$, where $R_{dry}$ is the value of said dry friction and where $\text{sign}(\dot{X})$ represents the sign of the speed of movement of the steering mechanism 1.

Preferably, the dry friction force $F_{dry}$, $R_{dry}$ is assessed from the drop $\underline{H}$ of the actuating force $F_{action}$, action such that this drop $\underline{H}$ is observed during steering reversals 15 of the steering mechanism 1, as illustrated in particular in FIGS. 1 and 2.

Said drop height $\underline{H}$ corresponds substantially to the difference between, on the one hand, the extremum (maximum, called «high value») reached by the actuating force $F_{action}$ just before the steering reversal 15, wherein said steering reversal 15 causes in particular the mechanism 1 (and therefore of the steering wheel 3) pass by a zero speed $\dot{X}$, and, on the other hand, the value (called «low value») taken by this same actuating force $F_{action}$ immediately after the steering reversal 15.

More particularly, the value of the dry friction $R_{dry}$ will advantageously correspond to the drop half-height $H/2$.

In practice, the successive steering reversals 15 can be detected for example by calculating the first time derivative of the signal representative of the actuating force $F_{action}$ (or, in a substantially equivalent manner, the signal representative of the assistance force $F_{assist}$), and by detecting the passage of this derivative by a peak, characterized by the crossing of a predetermined threshold (of derivative amplitude).

The high value and the low value of the signal of the actuating force $F_{action}$ which delimit (as the ordinate in FIGS. 1 and 2) and characterize the drop height $\underline{H}$, can be calculated at time limits (located on the abscissa in said FIGS. 1 and 2) which are located on either side of the steering reversal, and which correspond respectively to a first reference instant, which precedes, by a predetermined duration, the instant called «peak start instant» which characterizes the passage of the derivative above the threshold, and to a second reference instant which follows, by a predetermined duration, the instant called «peak end instant» which characterizes the instant where the derivative drops below said threshold. In an alternative and substantially equivalent manner, the first reference instant and the second reference instant can correspond to instants which respectively precede and follow, each by a predetermined duration, the average instant at which the steering reversal takes place, that is to say the instant corresponding to the (time) center of the derivative peak.

Moreover, the step (b) of assessing the dry friction $F_{dry}$, $R_{dry}$ is preferably carried out from an empirical friction model 21 which is constructed and refreshed over time by measurements of dry friction force $R_{mes\_1}, R_{mes\_2} \ldots R_{mes\_n}$ which are operated successively as and when using the steering mechanism 1, for example (and preferably) at each steering reversal 15.

Advantageously, the model 21 which serves to assess the friction is thus automatically updated in the course of the use of the steering mechanism 1, and more globally in the course of the (current) use of the vehicle, so that said model 21 is permanently re-adapted to the evolution of the conditions in which the steering mechanism 1 operates, and in particular to the evolution of the temperature or aging (wear) conditions.

By thus using an evolving friction model 21 which is periodically updated, rather than a constant or an invariant abacus which would be obtained by a single original calibration performed in the factory, the invention allows the estimation of dry friction to faithfully reflect the real (intrinsically non-constant) state of the friction in the steering mechanism 1, at any given instant $t$, whatever the said friction state is.

The accuracy of the method is thus increased.

Preferably, the step (b) of assessing the dry friction comprises a sub-step (b1) of acquiring a series of characterization points, during which the corresponding friction values are measured for several different values taken successively by the actuating force $F_{action}$ during the operation of the steering mechanism, in order to obtain empirically a series of distinct characterization points $P_1, P_2, \ldots P_n$ which associate each, to a measured value representative of the actuating force $F_{action\_1}, F_{action\_2}, \ldots F_{action\_n}$ a measured value of dry friction $R_{mes\_1}, R_{mes\_2} \ldots R_{mes\_n}$, then a sub-step (b2) of constructing an empirical friction model 21, during which a correlation law $\underline{L}$ is established between the characterization points $P_1, P_2, \ldots P_n$ constituting the series of characterization points, from the scatter chart formed by said series of said characterization points.

As indicated above, the characterization points can advantageously be acquired during the steering reversals 15.

Advantageously, by creating a friction model 21 from a scatter chart of points taken at different (distinct) values of actuating forces, rather than on the basis of a single calibration point, a model 21 is obtained that covers empirically an operating wide range, and which can thus faithfully give information about the level of dry friction $F_{dry}$ which corresponds to every considered actuating force (every actuating torque) $F_{action}(t)$ at a given instant $t$, whatever the intensity of said considered actuating force is.

In particular, in the assessment of the dry friction, it will thus be possible to take account of the fact that the value of the dry friction $R_{dry}$ is in practice an increasing function of the actuating force (actuating torque) $F_{action}$.

Here again, the invention therefore makes it possible to gain in accuracy when determining the dry friction, and therefore, consequently, when determining the tie-rod force.

Advantageously, the step (b1) of acquiring characterization points and the step (b2) of constructing model 21 can be refreshed iteratively during the operation of the steering mechanism 1, in such a way that the learning process that enables constructing the model is an ongoing process, which makes it therefore possible to have said model evolve in a rolling manner over time (wherein the newly acquired characterization points progressively replace the oldest characterization points, and the corresponding correlation law $\underline{L}$ is adapted consequently).

By way of indication, the size of the series of characterization points $P_1, P_2, \ldots P_n$ can be comprised between, on the one hand, at least 5 characterization points, or even at least 10 characterization points $P_1, P_2, \ldots P_n$ on the other hand, 50 or even 100 characterization points.

The sample of the characterization points will thus be of sufficiently significant size to create a reliable and representative model 21, even in case of punctual occurrence of an erroneous measurement.

As detailed above, the characterization points $P_1, P_2, \ldots P_n$ will be preferably acquired during the steering reversals 15, the measurement of the friction value $R_{mes\_1}, R_{mes\_2} \ldots R_{mes\_n}$ at the characterization points $P_1, P_2, \ldots P_n$ being obtained from the drop height $\underline{H}$ (and more particularly from the drop half-height H/2) of the signal representative of the actuating force $F_{action}$.

Preferably, the correlation law $\underline{L}$ is established in the form of an interpolation (for example polynomial) curve or of a regression curve relative to the series of characterization points $P_1, P_2, \ldots P_n$.

Particularly preferably, as illustrated in FIG. 3, the correlation law $\underline{L}$ is obtained by linear regression on the series of characterization points $P_1, P_2, \ldots P_n$, for example by the least squares method.

It is thus possible to obtain quickly, and by mobilizing only a modest power of calculation, a model 21 which is particularly representative of the real behavior of dry friction.

Furthermore, it will be noted that using a continuous correlation law $\underline{L}$ whose range of definition and validity extends, by extrapolation, beyond the sole characterization points used in the construction of the model 21, advantageously makes it possible to associate an estimation of the dry friction value $R_{dry}$ with any value of the actuating force $F_{action(t)}$ measured (or calculated) at the instant $t$, and this including when said value of the actuating force is situated beyond the range covered by said sole characterization points.

According to the invention, the method comprises a step (c) of calculating the tie-rod force $F_{tie-rod}$, which comprises a summing sub-step (c1) during which an expression 22 representative of the tie-rod is calculated, wherein said expression involves the algebraic sum of the actuating force $F_{action}$ and of the dry friction force $F_{dry}$: $F_{action}+F_{dry}=F_{cond}+F_{assist}+F_{dry}$, and a sub-step (c2) of filtering during which a low-pass filter 23 is applied, in order to be able to smooth the result of said expression 22 (at least) when said expression is calculated at the moment of a steering reversal 15 of the steering mechanism.

Indeed, since it exists, at the contacts between real solids, a bonding stiffness which is not infinite, then the actual dry friction does not evolve discontinuously during the steering reversals 15, that is to say that said actual dry friction does not change instantaneously from a positive value to an opposite negative value (or vice versa), but obeys, on the contrary, to a dynamics of admittedly fast, but nonetheless continuous, transition.

Now, said dry friction $F_{dry}$ is modeled herein by an expression $F_{dry}=-R_{dry}\cdot\text{sign}(\dot{X})$ which is proportional to the sign $\text{sign}(\dot{X})$ of the speed of movement $\dot{X}$ of the steering mechanism 1.

In practice, the speed of the assistance motor 2, that is to say the angular speed of rotation of the shaft 13 of said assistance motor 2, which is known very accurately can consider as a value representative of the speed of movement $\dot{X}$.

The signal $\text{sign}(\dot{X})$ which measures the sign of the speed of movement of the steering mechanism (and thus practically reflects the direction of rotation of the shaft 13 of the assistance motor) is, by nature, binary (the sign of the speed being either positive or negative).

As a result, if said signal $\text{sign}(\dot{X})$ is obtained or treated roughly, in numerical form, by a discrete sampling, a change in sign of the speed of movement of the steering mechanism 1 will be perceived in the form of an instantaneous switching of the binary value of said signal $\text{sign}(\dot{X})$, wherein said switching will thus occur instantaneously, at the moment of refreshing the signal immediately after the instant where the speed passes through zero.

Accordingly, such an instantaneous switching would have the effect of introducing a discontinuity (a peak) in the assessment of the friction, and therefore, consequently, in the calculation of the tie-rod force.

Here, advantageously, adding the low-pass filter 23 makes it possible to artificially introduce a dynamic limitation in the signal $\text{sign}(\dot{X})$ which measures the sign of the speed of movement of the steering mechanism, wherein said dynamic limitation acts on (and as a complement to) the binary perception of the change in sign so as to create, when the sign changes, a continuous transition in said signal $\text{sign}(\dot{X})$ which is thus filtered, wherein said continuous transition reproduces the real physical dynamics of the reversal phenomenon.

In other words, the low-pass filtering 23 allows to restore the progressivity of the reversal of the friction, such that this reversal is perceived by the calculator which manages the method according to the invention, thus avoiding that the processing method generates from its own a discontinuity which would be reflected, falsely, in a peak of friction (and thus in a peak of tie-rod force) without any real material cause.

Concretely, as can be clearly seen in FIG. 2 despite the low pass filtering 23 is not absolutely perfect as said filtering may leave a slight residual perturbation 24 (a damped peak) in the calculated tie-rod force $F_{tie-rod}$, at the moment of the steering reversal 15, the said low-pass filtering 23 nevertheless enables keeping the amplitude of said residual perturbation 24 well below the observed difference between the real tie-rod force and the actuating force $F_{action}$, that is to say that said low-pass filtering enables, graphically, to permanently keep the calculated tie-rod force curve (appearing in dotted lines in FIG. 2) much closer to the real tie-rod force curve (appearing in continuous line on this same FIG. 2) than the curve representative of the actuating force $F_{action}$ (shown in mixed line in said FIG. 2).

Conversely, it will be noted that in the absence of filtering, the calculated tie-rod force curve could, at the moment of the steering reversals 15, have a peak which would move said curve away from the real tie-rod force curve, farther than the curve representative of the actuating force, which means, in this case, that the calculated tie-rod force value $F_{tie-rod}$ would be (temporarily) even less reliable than if said tie-rod force value had been simply considered equal to the actuating force value $F_{action}$.

It can therefore be observed that using the low-pass filter 23 according to the invention allows determining in all circumstances the calculated tie-rod force $F_{tie-rod}$ with a much higher accuracy than the previously known methods could achieve, and this including at the critical moment of the steering reversal 15.

More globally, it is remarkable that the fact of combining, according to the invention, on the one hand, a consideration of the dry friction and, on the other hand, the use of a low-pass (peaks dampening) filter 23 makes it possible to have the tie-rod force estimated by the calculation be as close as possible to the real tie-rod force, and keeping this proximity (this cohesion between the curves) in all circumstances, including (in particular) in the vicinity of the steering reversal areas 15 (in which the filter allows attenuating significantly the effects of the discontinuity of the raw signal reflecting the sign of the speed of movement).

Preferably, as illustrated in FIG. 4, the low-pass filtering will intervene on the signal $\text{sign}(\dot{X})$ that is representative of the sign of the speed of movement of the steering mechanism 1, upstream of the calculation (c1) of the expression 22, and even upstream of the calculation of the dry friction $F_{dry}$ (which consists in multiplying the sign of the speed $\text{sign}(\dot{X})$ by the dry friction value $R_{dry}$), thus allowing in particular to restore the dynamics of continuous transition "at the source", directly in the concerned signal (sign of speed), as «input» of the expression 22.

However, it can be also possible to operate this low-pass filtering 23 further downstream, for example on the dry friction signal $F_{dry}$ derived from the product $F_{dry}=-R_{dry}\ast\text{sign}(\dot{X})$, or even possibly on the expression 22, after calculation (c1) of the latter, that is to say as «output» of said expression 22.

Preferably, the time constant of the low-pass filter 23 is comprised between 0.05 s and 0.5 s, and preferably between 0.1 s (100 milliseconds) and 0.3 s (300 milliseconds), for example substantially equal to 0.15 s (150 milliseconds).

Advantageously, these orders of magnitude correspond substantially to the characteristic duration of the real switching dynamics of the dry friction, that is to say the characteristic duration of the continuous transition of said dry friction, as it is observed during the steering reversals 15.

The low pass filter 23 will thus be able to reproduce a realistic artificial dynamics, close to the real transition dynamics.

Moreover, during the step (c) of calculating the tie-rod force, it is preferably also possible to take in consideration the viscous friction force $F_{visq}$ which affects the movement of the steering mechanism 1, and which is proportional to the speed of movement $\dot{X}$ of said steering mechanism.

Although the contribution of this term of viscous friction $F_{visq}$ is not predominant, but on the contrary rather ancillary, with regard to the contributions of the actuating force $F_{action}$ and of the dry friction $F_{dry}$, consideration thereof nevertheless allows to further improve the calculation accuracy of the tie-rod force $F_{tie-rod}$.

Concretely, this viscous friction can be expressed in the form $F_{visq}=-R_{vis}\cdot\dot{X}$ where $R_{visq}$ is the viscous friction coefficient and where $\dot{X}$ represents the speed of movement of the steering mechanism.

The viscous friction coefficient $R_{visq}$ can be predetermined by a test campaign and stored in the form of a chart in a non-volatile memory of the calculator that manages the method.

For example, the speed of movement can be calculated, by a time-derivative calculation, from a position sensor capable of measuring the angular position of the steering wheel 3, the linear position of the rack 6, or the angular position of the shaft 13 of the assistance motor.

In an analogous manner, during step (c) of calculating the tie-rod force, it will be also possible to take in consideration the inertial force M·Ü which is exerted on the steering mechanism 1.

Here again, although it is a term whose contribution is generally rather ancillary with regard to the contributions of the actuating force $F_{action}$ and of the dry friction $F_{dry}$, consideration thereof will nevertheless allow to further improve the calculation accuracy of the tie-rod force $F_{tie-rod}$.

Concretely, said inertial force can be calculated by making the product of the—known-(movable) mass $\underline{M}$ of the steering mechanism by the instantaneous acceleration Ẍ of said steering mechanism, wherein said acceleration can be obtained, for example, by calculating the derivative of the speed Ẋ.

In practice, since the inertia of the assistance motor 2 is very much greater than the inertia of the other movable members of the steering mechanism 1 (such as the rack 6), it will be possible, as a first (realistic) approximation to consider only the mass and the acceleration of the shaft 13 of the assistance motor 2 in order to assess the inertial force M·Ẍ.

Ultimately, the expression 22 representative of the tie-rod force will be preferably given by: $F_{tie-rod} = F_{cond} + F_{assist} + F_{dry} + F_{visq} - M \cdot \ddot{X}$, with:

$F_{tie-rod}$ the tie-rod force, $F_{cond}$ the driver force, $F_{assist}$ the assistance force, $F_{dry}$ the dry friction, with $F_{dry} = -R_{dry} \cdot \text{sign}(\dot{X})$ where $R_{dry}$ is the value of the dry friction and where $\text{sign}(\dot{X})$ represents the sign of the speed of movement of the steering mechanism, $F_{visq}$ the viscous friction, with $F_{visq} = -R_{visq} \cdot \dot{X}$, where $R_{visq}$ is the viscous friction coefficient and where Ẋ represents the speed of movement of the steering mechanism.

M·Ẍ the inertial force which depends on the movable mass $\underline{M}$ of the steering mechanism and the instantaneous acceleration Ẍ of said steering mechanism.

As indicated above, the dry friction value $R_{dry}$ is preferably obtained from a model 21, and is preferably an increasing function (which typically follows the regression line $\underline{L}$ mentioned above) of the actuating force: $R_{dry} = f(F_{assist} + F_{cond})$.

It will be noted that the expression representative of the tie-rod force above corresponds to the application of the fundamental principle of the dynamics to the endpoints of the steering mechanism 1.

It should also be noted that the predominant terms (which are therefore sufficient on their own to obtain a result representative of the real tie-rod force) of this expression 22 are, as a first approximation, the actuating force ($F_{assist} + F_{cond}$) and the dry friction force $F_{dry}$.

Of course, the functions assigned to the method according to the invention can be carried out by appropriate calculation modules, and more particularly by an assistance law 12 application module, an acquisition module (of characterization points) 16, a model construction module (calculation module of the correlation law $\underline{L}$) 17, and a friction assessment module 18 (applying the correlation law $\underline{L}$ defined accordingly to estimate, at any moment and for any value of the actuating force $C_{action}(t)$, the corresponding friction value $R_{dry}(t)$), a tie-rod force $F_{tie-rod}$ calculation module 19, and a low-pass filtering (or «filter») module 23.

Each of the aforementioned modules can be formed by an electronic circuit, an electronic card, a calculator (computer), a programmable logic controller, or any other equivalent device, preferably arranged to process in (discrete) digital form the signals that are necessary to the method.

Each of the aforementioned modules can present a physical control structure, defined by the wiring arrangement of its electronic components, and/or, preferably, a virtual control structure, defined by computer programming.

Of course, the invention also concerns as such any data medium readable by a computer and containing computer program code elements allowing to execute the method in accordance with the invention when said medium is read by a computer.

It also concerns a power steering system comprising a power steering mechanism 1 controlled by a management module including all or part of the aforementioned modules, and therefore able to implement the method according to the invention.

It also concerns a motor vehicle, in particular with steered wheels 9, 10, which may be possibly also drive wheels, equipped with such a power steering system.

Finally, it should be noted that the method in accordance with the invention, that makes use of signals which are generally already available within power steering systems, can be easily generalized to any power steering systems, including by retrofitting many already existing power steering systems, by a mere reprogramming of the calculator thereof.

Of course, the invention is in no way limited to the only embodiments described above, the person skilled in the art being in particular capable of isolating or freely combining together either of the abovementioned characteristics, or of substituting equivalents thereto.

The invention claimed is:

1. A method for determining a tie-rod force ($F_{tie-rod}$) which is a force exerted, at a considered instant, by an environment of a vehicle on a power steering mechanism of the vehicle, and the power steering mechanism is maneuvered at least by an assistance motor, the method comprising:
   a step (a) of determining an actuating force ($F_{action}$) exerted at the considered instant on the steering mechanism based on (i) an assistance force ($F_{assist}$) exerted by an assistance motor on the steering mechanism, and (ii) a driver force ($F_{cond}$) exerted by a driver of the vehicle on the steering mechanism;
   a step (b) of determining a value of a dry friction force ($F_{dry}$, $R_{dry}$), which is exerted on the steering mechanism at the considered instant;
   a step (c) of calculating the tie-rod force ($F_{tie-rod}$) by (i) summing the actuating force ($F_{action}$) and the dry friction force ($F_{dry}$), and (ii) applying a low-pass filter that filters a result of the summing when the summing is calculated at a moment of a steering reversal of the steering mechanism; and
   a step (d) of, in response to calculating the tie-rod force ($F_{tie-rod}$), control the steering mechanism to control the assistance force exerted by the assistance motor on the steering mechanism based on the tie-rod force ($F_{tie-rod}$) exerted, as a counter-force, on the steering mechanism in order to more accurately maneuver steering operations of the vehicle.

2. The method according to claim 1, wherein the time constant of the low-pass filter is between 0.05 s and 0.5 s.

3. The method according to claim 1, wherein the dry friction force ($F_{dry}$, $R_{dry}$) is determined based on a difference in the actuating force ($F_{action}$) during steering reversals of the steering mechanism.

4. The method according to claim 1, wherein step (b) is performed based on an empirical friction model that is constructed and refreshed over time by measurements of dry friction force $R_{mes\_1}$, $R_{mes\_2}$ ... $R_{mes\_n}$ which are determined successively during use of the steering mechanism.

5. The method according to claim 1, wherein step (b) includes:
- a sub-step (b1) of acquiring a series of characterization points, and determining a corresponding series of dry friction forces ($F_{dry}$, $R_{dry}$) of each of the series of characterization points successively based on the actuating force ($F_{action}$) during the operation of the steering mechanism, in order to obtain empirically a series of distinct characterization points ($P_1$, $P_2$, ... $P_n$) which associate each, to a measured value representative of the actuating force ($F_{action\_1}$, $F_{action\_2}$, ... $F_{action\_n}$), a measured value of dry friction ($R_{mes\_1}$, $R_{mes\_2}$ ... $R_{mes\_n}$), and
- a sub-step (b2) of constructing an empirical friction model, during which a correlation law L is established between the characterization points ($P_1$, $P_2$, ... $P_n$) constituting the series of characterization points, from a scatter chart formed by the series of the characterization points.

6. The method according to claim 1, wherein during step (c) of calculating the tie-rod force ($F_{tie-rod}$), the tie-rod force ($F_{tie-rod}$) is also based on a viscous friction force ($F_{visq}$) which affects movement of the steering mechanism, and which is proportional to a speed of movement ($\dot{X}$) of the steering mechanism.

7. The method according to claim 1, wherein during step (c) of calculating the tie-rod force, the tie-rod force ($F_{tie-rod}$) is also based on an inertial force ($M \cdot \ddot{X}$) that is exerted on the steering mechanism.

8. The method according to claim 1, wherein an expression representative of the tie-rod force ($F_{tie-rod}$) is given by:

$$F_{tie-rod} = F_{cond} + F_{assist} + F_{dry} + F_{visq} - M \cdot \ddot{X}, \text{ with:}$$

$F_{tie-rod}$ the tie-rod force,
$F_{cond}$ the driver force,
$F_{assist}$ the assistance force,
$F_{dry}$ the dry friction, with $F_{dry} = -R_{dry} \cdot \text{sign}(\dot{X})$, where $R_{dry}$ is the value of the dry friction and where $\text{sign}(\dot{X})$ represents the sign of the speed of movement of the steering mechanism,
$F_{visq}$ the viscous friction, with $F_{visq} = -R_{visq} \cdot \dot{X}$, where $R_{visq}$ is the viscous friction coefficient and where $\dot{X}$ represents the speed of movement of the steering mechanism, and
$M \cdot \ddot{X}$ the inertial force which depends on the movable mass $\underline{M}$ of the steering mechanism and the instantaneous acceleration $\ddot{X}$ of said steering mechanism.

9. The method according to claim 8, wherein the value of the dry friction is obtained from a model.

10. The method according to claim 8, wherein the value of the dry friction is an increasing function of the actuating force:

$$R_{dry} = f(F_{assist} + F_{cond}).$$

* * * * *